United States Patent
Tiirola et al.

(10) Patent No.: US 7,352,725 B2
(45) Date of Patent: Apr. 1, 2008

(54) COMMUNICATION METHOD AND ARRANGEMENT IN A CODE DIVISION MULTIPLE ACCESS (CDMA) RADIO SYSTEM

(75) Inventors: Esa Tiirola, Oulu (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 765 days.

(21) Appl. No.: 10/684,825

(22) Filed: Oct. 15, 2003

(65) Prior Publication Data

US 2005/0041626 A1   Feb. 24, 2005

(30) Foreign Application Priority Data

Aug. 21, 2003  (FI) .................................. 20031176

(51) Int. Cl.
*H04B 7/216* (2006.01)
(52) U.S. Cl. ....................... 370/335; 370/342; 370/913
(58) Field of Classification Search ................ 370/317, 370/318, 320, 335, 342, 912, 913
See application file for complete search history.

(56) References Cited

U.S. PATENT DOCUMENTS

| | | | | |
|---|---|---|---|---|
| 6,101,168 A | * | 8/2000 | Chen et al. ................. | 370/342 |
| 6,289,003 B1 | * | 9/2001 | Raitola et al. .............. | 370/913 |
| 6,317,854 B1 | * | 11/2001 | Watanabe .................... | 714/749 |
| 6,507,572 B1 | * | 1/2003 | Kumar et al. ............... | 370/335 |
| 2002/0042283 A1 | | 4/2002 | Moulsley | |

FOREIGN PATENT DOCUMENTS

| | | |
|---|---|---|
| CN | 1375949 | 10/2002 |
| CN | 1398461 | 2/2003 |
| EP | 1 207 644 A | 5/2002 |
| WO | WO 01/78291 A2 | 10/2001 |
| WO | WO 02/32009 | 4/2002 |

\* cited by examiner

*Primary Examiner*—Quochien B. Vuong
(74) *Attorney, Agent, or Firm*—Squire, Sanders & Dempsey LLP

(57) ABSTRACT

A communication method and a communication arrangement in a Code Division Multiple Access radio system is provided According to one embodiment, at least two transceivers of the radio system communicate with a packet switched connection through a radio interface. The quality of the packet switched connection is measured and a target Signal Interference Ratio is adjusted based on the quality measurement. When a transceiver receiving packets transmits a request to retransmit in the case of failure in reception of at least one packet, a transceiver transmitting packets is configured to retransmit each packet requested as a response to the request. The target Signal Interference Ratio for retransmission of a packet is set lower than the target Signal Interference Ratio for the first transmission of the corresponding packet.

12 Claims, 3 Drawing Sheets

COMMUNICATION METHOD AND ARRANGEMENT IN A CODE DIVISION MULTIPLE ACCESS (CDMA) RADIO SYSTEM

BACKGROUND OF THE INVENTION

1. Field of the Invention

The invention relates to a communication method and arrangement based on a packet switched connection in a radio system.

2. Description of the Related Art

It is vital to have power control of signals in a radio system. This is of a particular importance in a CDMA (Code Division Multiple Access) radio system, which is interference-limited. The main task of the power control in a CDMA radio system is to limit signal powers, and hence increase capacity by decreasing interference inside each cell.

For example, in a WCDMA (Wide band CDMA) radio system the power control mechanism includes an inner loop power control and an outer loop power control.

The purpose of the inner loop power control is to eliminate rapid variations in the strength of a received signal caused by the radio channel.

In the inner loop power control, a base station compares the SIR (Signal Interference Ratio) of the received signal to a target SIR. If the SIR of the received signal is below the target SIR, the base station transmits a signal commanding the user terminal to increase its transmission power. Correspondingly, if the SIR of the received signal is above the target SIR, the base station transmits a signal commanding the user terminal to decrease its transmission power.

In the outer loop control a radio network controller (RNC) compares the quality of service to a target quality. The quality can be measured as, for instance, BER (Bit Error Rate), BLER (Block Error Rate), FER (Frame Error Rate), CRC (Cyclic Redundancy Check), soft information from the decoder, ratio of received bit energy and noise, etc. If the quality of service is below the target quality, the RNC commands the base station to increase its target SIR. Similarly, if the quality of service is above the target quality, the RNC commands the base station to decrease its target SIR.

In radio systems utilizing packet-switched connection, the packets are usually protected against noise, fading and interference by channel coding, such as FEC (Forward Error correction Coding). In spite of protection, failure may occur in the reception of a packet, which can be compensated for by retransmission. The retransmission takes place when the receiving transceiver of packets requests the faulty packet to be repeated. This can be performed by an ARQ (Automatic Repeat Request) mechanism. In a receiver utilizing HARQ (Hybrid ARQ), the faulty packet and the retransmitted packet can be combined. The combining can be especially effective if different transmissions of the same packet are utilized in decoding.

There are, however, problems related to the use of retransmission with power control, especially in the case of HARQ. When a packet is communicated unsuccessfully, the outer loop power control increases the target SIR, which unnecessarily leads to a higher transmission power during retransmission of the packet. The increased transmission power in relation to interference in turn decreases the capacity and service quality of the radio system.

SUMMARY OF THE INVENTION

According to an embodiment of the invention, there is provided a communication method in a CDMA radio system using a transmission power control based on a SIR measurement. The method includes a step of communicating, measuring, transmitting, adjusting, retransmitting, and controlling. The communicating step communicates between at least two transceivers of the radio system using a packet switched connection through a radio interface. The measuring step measures a quality of the packet switched connection. The adjusting step adjusts a target SIR based on the quality measured. The transmitting step transmits from a transceiver receiving packets a request to retransmit at least one packet having failure in reception. The retransmitting step retransmits from a transceiver transmitting packets, each packet requested as a response to the request. The controlling step controls a transmission power by setting a lower target SIR for retransmission of a packet than the target SIR for the first transmission of the corresponding packet.

According to another embodiment of the invention, there is provided a communication arrangement in a CDMA radio system using a transmission power control based on a SIR measurement. The arrangement includes at least two transceivers of the radio system being configured to communicate with a packet switched connection through a radio interface. The arrangement includes a device for measuring a quality of the packet switched connection. The arrangement is configured to adjust a target SIR based on the quality measured. The arrangement includes a transceiver receiving packets may be configured to transmit a request to retransmit in the case of failure in reception of at least one packet. A transceiver transmitting packets may be configured to retransmit each packet requested as a response to the request, and the arrangement may be configured to set a lower target SIR for retransmission of a packet than the target SIR for the first transmission of the corresponding packet.

The invention provides several advantages. One such advantage is that the invention provides an improved power control mechanism. The invention provides a specific way to control the transmission power of retransmissions and it improves the capacity of a cell by reducing interference.

BRIEF DESCRIPTION OF THE DRAWINGS

In the following, the invention will be described in greater detail with reference to the preferred embodiments and the accompanying drawings, in which.

DETAILED DESCRIPTION OF THE PREFERRED EMBODIMENTS

Figure 1:
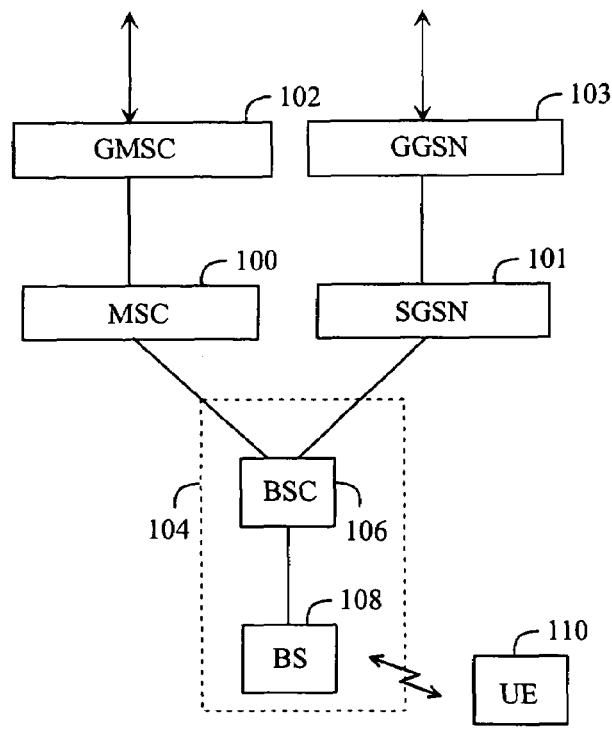
FIG. 1 shows a radio system according to an embodiment of the invention.

FIG. 1 illustrates an example of a structure of a radio system. The radio system can be based on, for example, UMTS (Universal Mobile Telephone System) or WCDMA (Wide-band Code Division Multiple Access).

The core network may, for example, correspond to the combined structure of the GSM (Global System for Mobile Communications) and GPRS systems. The GSM network elements may be responsible for the implementation of circuit-switched connections, and the GPRS network elements for the implementation of packet-switched connections. Some of the network elements may be, however, shared by both systems.

A mobile services switching center (MSC) 100 may enable circuit-switched signalling in the radio system. A serving GPRS support node (SGSN) 101 in turn may enable packet-switched signalling. All traffic in the radio system may be controlled by the MSC 100.

The core network may have a gateway unit 102, which represents a gateway mobile service switching center (GMSC) for attending to the circuit-switched connections between the core network and external networks, such as a public land mobile network (PLMN) or a public switched telephone network (PSTN). A gateway GPRS support node (GGSN) 103 may attend to the packet-switched connections between the core network and external networks, such as the Internet.

In this embodiment, the MSC 100 and the SGSN are connected to a radio access network (RAN) 104, which may include at least one base station controller 106 controlling at least one base station 108. The base station controller 106 can also be called a radio network controller, and the base station can be called a node B. A user terminal 110 communicates with at least one base station 108 over a radio interface.

In this embodiment, the user terminal 110 can communicate with the base station 108 using a GPRS method. Data in packets contain address and control data in addition to the actual traffic data. Several connections may employ the same transmission channel simultaneously. A packet-switching method may be suitable for data transmission where the data to be transmitted is generated in bursts. In such a case, it is not necessary to allocate a data link for the entire duration of transmission but only for the time it takes to transmit the packets. This reduces costs and saves capacity considerably during both the set-up and use of the network.

Figure 2:
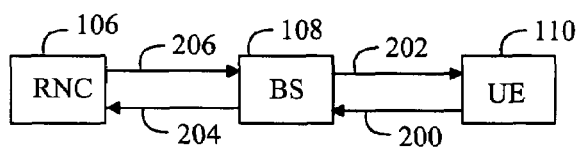
FIG. 2 illustrates power control according to an embodiment of the invention.

FIG. 2 represents both an outer and inner loop power control. When the user terminal 110 transmits a signal 200, such as a packet, to a base station 108, the base station 108 may form a SIR (Signal-to-Interference Ratio) estimate of the received signal. The base station may compare the SIR estimate to a target SIR, and transmit a signal 202 with a command, which depends on the comparison. If the value of the SIR estimate is smaller than the value of the target SIR, the base station 108 may command the user terminal 110 to increase its transmission power. If, on the other hand, the SIR estimate is higher than the target SIR, the base station may command the user terminal to decrease its transmission power.

The base station 108 sends the radio network controller 106 a signal 204 having information on the quality of the connection. The quality can be the quality of service and the information can indicate frame reliability, which can be based on the use of a reliability indicator. The reliability indicator can be CRC (Cyclic Redundancy Check), estimated BER, soft information from a decoder, $E_b/N_0$, etc.

The target SIR can be changed by an outer-loop power control algorithm which has previously been expressed as follows:

$$\text{Target\_SIR}(n+1) = \text{Target\_SIR}(n) \pm \Delta [dB], \quad \text{Equation (1)}$$

where the calculation can be in dB scale, Target_SIR represents the target SIR and n is the index of coding block. The delta can be defined as $\Delta = \hat{f}s - F_{th}s$, where $\hat{f}$ is 1 when there is a block error and $\hat{f}$ is 0 when there is no block error, $F_{th}$ is the desired (target) BLER, which varies typically between 1% to 20%, and s is the step size of the delta (such as 1 dB, 2 dB or 3 dB).

The radio network controller 106 in turn may send the base station 108 a signal 206 which effects the target SIR according to the formula (1). If the value of the quality of service is below a quality target value, which is true in the case of a failure in the reception of a packet, the radio network controller 108 may increase the target SIR in the base station 108. As a result of this, the average transmission power of a retransmission of a packet is higher than during the first transmission of the packet, assuming that the interference level is the same. The interference may also be considered to include noise. If the value of the quality of service is above a target value, the radio network controller 108 decreases the target SIR in the base station 108, which lowers the average transmission power with respect to interference. This takes place when a packet is received successfully.

According to the invention, the target SIR can be defined by an outer-loop power control algorithm as follows:

$$\text{Target\_SIR}(N^{th}) = \text{Target\_SIR(master)} - \text{Step}(N^{th})[dB], \quad \text{Equation (2)}$$

where Target_SIR($N^{th}$) represents the SIR of the $N^{th}$ retransmission of a packet, Target_SIR(master) represents the target SIR of the first transmission of a packet, Step($N^{th}$) represents the amount in the decrease in the transmission power of the retransmission and N is an ordinal number denoting the index of retransmission. Target_SIR(master) can be adjusted e.g. according to the formula (1). Often there are at maximum two retransmissions (N=1 or 2), but in general there can be any number of retransmissions from 1 to infinity. Thus, the invention can be configured to define a specific target SIR for each retransmission of a packet.

Figure 3A:
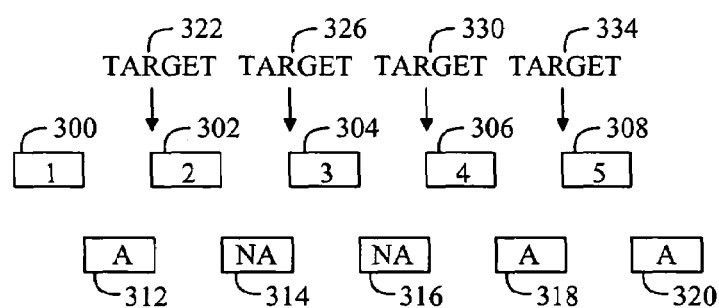
FIG. 3A shows transmission and retransmission of packets according to the stop and wait principle according to an embodiment of the invention.
Figure 3B:
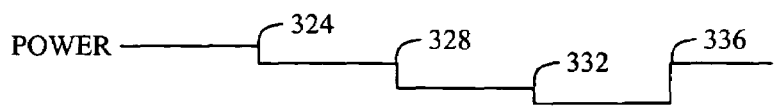
FIG. 3B illustrates behaviour of transmission power in relation to transmission and retransmission in FIG. 3A according to an embodiment of the invention.

FIGS. 3A and 3B show an example of the transmission and retransmission of packets using the stop and wait principle, which is known by one skilled in the art. The stop and wait principle corresponds to the case where a transmitter is capable of memorizing only one packet at a time. The transmitter does not transmit a packet before it receives an ACK (Acknowledge) signal or a NACK (Not Acknowledge) signal from the receiver.

As shown in the example of FIGS. 3A and 3P, after the first packet 300 is transmitted from the transmitter, it is acknowledged as successfully received by an ACK signal 312 from the receiver. At moment 322 before transmitting a new packet 302 the target SIR may be lowered because of a successful transmission. Right after that at moment 324 the transmission power may be adjusted according to the decreased target SIR leading to a lowered average transmission power (if the noise level has not increased). Then the second packet 302 is transmitted but because there is a failure in the reception, the receiver of the packet 302 may transmit a NACK signal 314 requesting a retransmission of the faulty packet. According to the invention, the target SIR for retransmissions may be adjusted differently from the first transmission of a packet. Hence, the target SIR is lowered according to Equation (2) at moment 326. The target SIR for the first retransmission becomes Target_SIR($1^{st}$)=Target_SIR(master)-Step($1^{st}$), where the term Target_SIR(master) is the target SIR at moment 322. The transmission power at moment 328 is adjusted according to the decreased target SIR. The transmitter transmits the packet again (packet 304) at a lowered transmission power with respect to the interference level. However, in this example, the transmission fails again and the receiver transmits a NACK signal 316. The target SIR can be adjusted again, and in this example it is decreased at moment 330. The target SIR becomes Target_SIR($2^{nd}$)=Target_SIR(master)−Step($2^{nd}$), where the term Target_SIR(master) is the target SIR 322 (the target SIR for the first transmission of a packet). The transmission power at moment 332 may be adjusted according to the decreased target SIR. The transmitter may transmit the packet once again (packet 306) at a lowered transmission power. This time the packet is correctly received and the receiver transmits an ACK signal 318. The target SIR may be increased at moment 334 leading to an increased transmission power (relative to the interference) at moment 336 for the first transmission of a packet 308, the successful reception of which is acknowledged by an ACK signal 320.

Figure 4:
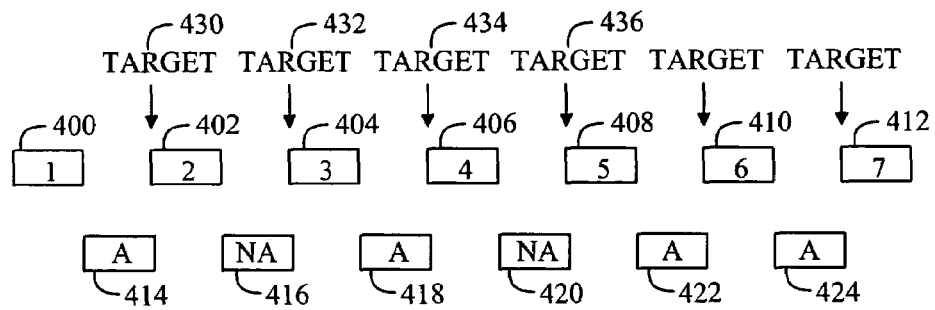
FIG. 4 shows transmission and retransmission of packets according to a selective repeat scheme according to an embodiment of the invention.

FIG. 4 illustrates an example of a communication session in a selective repeat scheme. In this case both the transmitter and the receiver have buffer memories for storing packets. The first packet 400 is successfully transmitted, which is acknowledged by an ACK signal 414 from the receiver. The target SIR may be adjusted at moment 430. The second packet 402 is transmitted, but as it fails, the receiver transmits a NACK signal 416. The target SIR may be adjusted at moment 432, and the third packet 404 may be transmitted successfully and acknowledged with an ACK signal 418 from the receiver. The target SIR at moment 434 may be calculated using Equation (2) such that the term Target_SIR (master) is the target SIR at moment 432. The target SIR for the first retransmission becomes Target_SIR($1^{st}$)=Target_SIR(master)−$\Delta(1^{st})$, which lowers the average transmission power of the packet 406 in relation to interference. The retransmission fails, however, and the receiver transmits a NACK signal 420. The target SIR for the packet 408, which may be the first transmission, is formed at moment 436. Since the transmission is successful, the receiver transmits an ACK signal 422. The target SIR for the packet 410 may be formed by Equation (2) such that the term Target_SIR (master) is the target SIR 436. The target SIR for the second retransmission becomes Target_SIR($2^{nd}$)=Target_SIR(master)−$\Delta(2^{nd})$, which lowers the average transmission power of the packet 410 in relation to interference. This transmission leads to an ACK signal 424 from the receiver. The transmission of packets continues similarly with the packet 412, etc.

The invention lowers the absolute transmission power of the retransmission compared to the first transmission of a particular packet, if the channel remains unchanged (no change, for example, in path loss, slow fading and fast fading). Since this is rarely the situation in a radio system, the transmission power depends on both the interference level and the transmission power of the first transmission of the packet, resulting usually in a lowered average transmission power.

Figure 5:
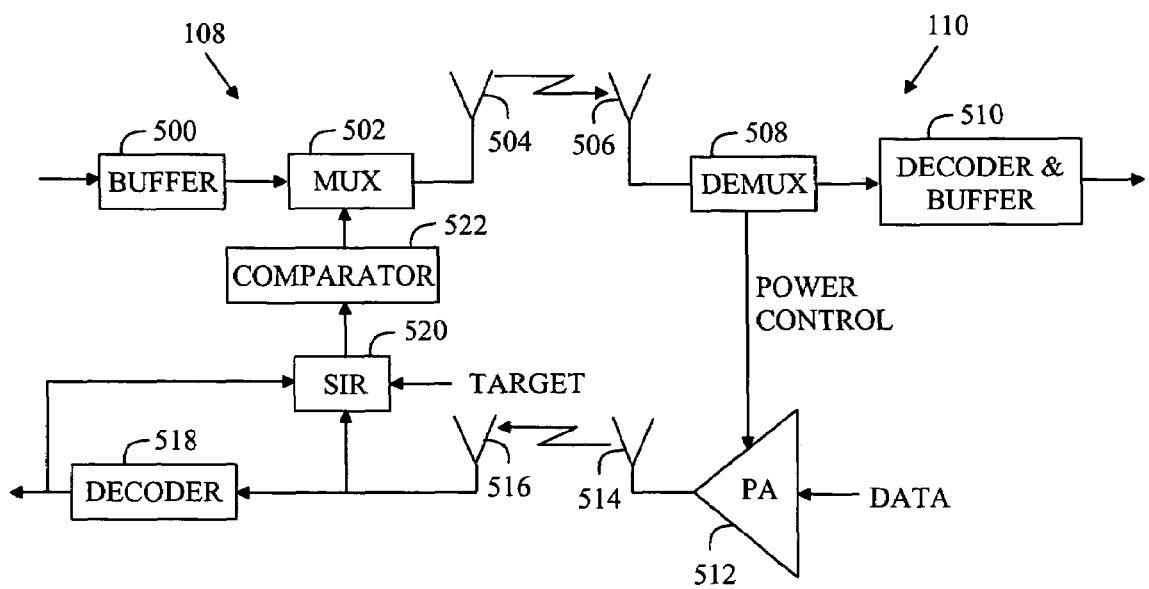
FIG. 5 shows closed loop power control according to an embodiment of the invention.

FIG. 5 illustrates an example of a closed loop power control. The data for the user can be input from a buffer memory 500 to a multiplexer 502, which multiplexes the power control bits to the data stream in a base station 108. The buffer memory may not always be needed. In this embodiment, the data is encoded by a FEC code, such as a turbo code, and the data may also include information on the type of HARQ (type I HARQ, type II HARQ). The baseband signal with data and power control bits is spread by a CDMA spreading code and mixed with a desired carrier frequency in order to transmit the radio frequency signal from an antenna 504. The process of coding, type defining, spreading and mixing the signal are not shown in FIG. 5. An antenna 506 of a user terminal 110 receives the signal. The signal is mixed to a baseband signal and despread by a spreading code. The process of despreading and mixing the signal are not shown in FIG. 5. The signal may be demultiplexed in a demultiplexer 508, which separates data and power control bits. The data is fed to a block 510 to be decoded. The block 510 may include a buffer memory for storing a packet. The power control bits are fed to a power amplifier 512, which adjusts its amplification according to the power control bits. The power amplifier 512 amplifies the signal to be transmitted by the user terminal 110. The transmitter of the user terminal is basically similar to the transmitter of the base station. The signal is transmitted from an antenna 514, which may be the same as the antenna 506. The antenna 516, which may the same as the antenna 504, receives the signal which is mixed to a baseband signal and despread by a spreading code. The process of despreading and mixing are not shown in FIG. 5. The signal is then fed to a decoding block 518. The SIR measurement in the block 520 can be made before or after the decoding performed by the decoding block as indicated by either of the two arrows. The block 520 performs the SIR estimation for the despread control symbols. Generally, the SIR measurement is divided into a signal power measurement and an interference power measurement. The measurement is performed on the DPCCH channel (Dedicated Physical Control Channel). The measured SIR is compared with the target SIR received from the radio network controller in the block 522. Based on the comparison of block 522, the block 522 inputs the power control bits to the multiplexer 502.

Instead of changing the transmission a step up or down, the power control bits may define a specific transmission power for each retransmission of a packet.

One way to implement HARQ is to use chase combining where a retransmitted packet is similar to the originally transmitted packet. To further improve performance, it is also possible to use incremental redundancy (IR), where a retransmitted packet includes new redundancy bits. To utilize HARQ, the receiving transceiver may be equipped with a buffer memory in which faulty packets can be stored in the embodiment shown in FIG. 5 the block 510 may include the buffer memory. To operate similar to the embodiment shown in FIG. 4, the transmitter may also need a memory which may be included in FIG. 5 in block 500.

Figure 6:
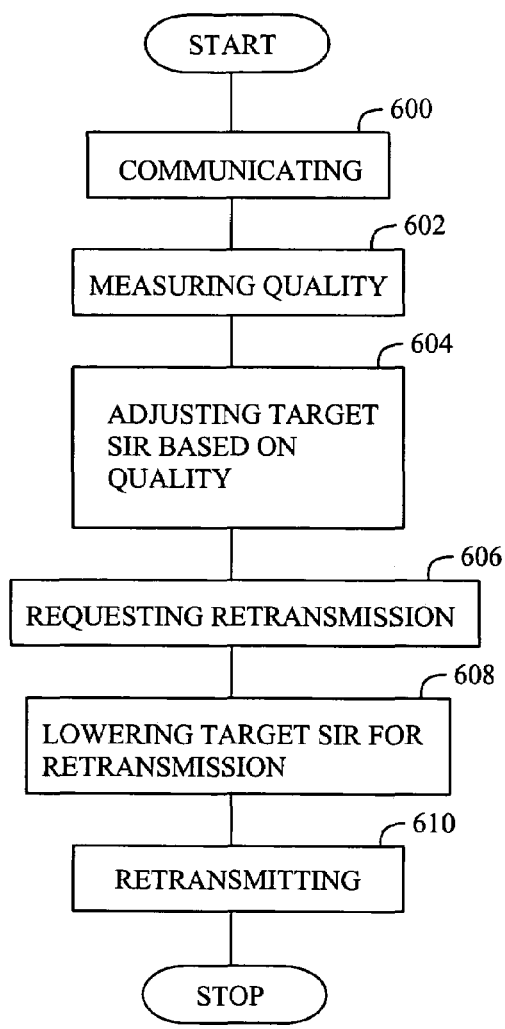
FIG. 6 shows a flow chart of a communication method according to an embodiment of the invention.

FIG. 6 shows again the main steps of the presented method according to one embodiment of the invention. In step 600 at least two transceivers of the radio system communicate using a packet switched connection through a radio interface. In step 602 the quality of the packet switched connection is measured. The power control system adjusts a target SIR based on the quality measured in step 604. In step 606 a transceiver receiving packets transmits a request to retransmit at least one packet having failure in reception. In step 608 a transceiver transmitting packets transmits each packet requested as a response to the request. In step 610 the transmission power is controlled by setting a lower target SIR for retransmission of a packet than the target SIR for the first transmission of the corresponding packet.

Figure 7:
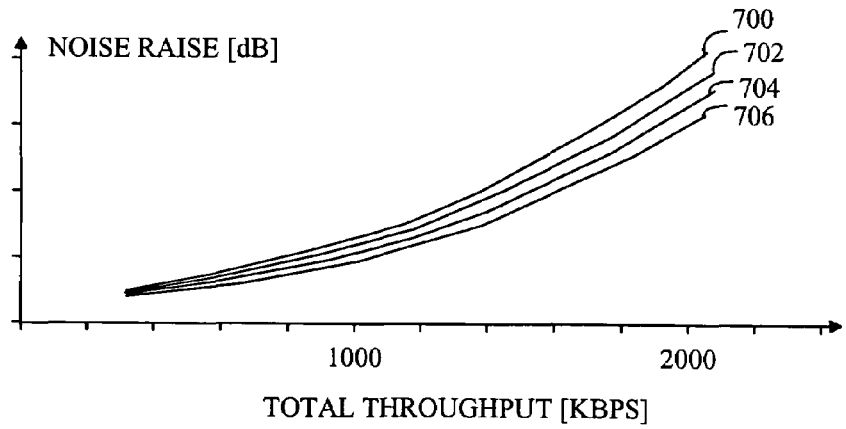
FIG. 7 illustrates simulation results according to an embodiment of the invention.

FIG. 7 shows an example of the simulation results of the invention. In this example it is assumed that the user terminal moves 3 km/h, data rate is 384 kbps with ⅓ turbo coding, HARQ with chase combining is used and the maximum number of retransmissions is 2. Curve 700 represents a case where the failed transmission (first transmission or first retransmission) of a packet is not utilized in the combining. Curves 702 to 706 represent cases where the failed transmission of a packet is utilized in the combining.

In curve 702 a retransmitted packet is transmitted using the same power as the first packet. In curve 704 a retransmitted packet transmitted is transmitted using 2 dB smaller target SIR value than the first packet. In curve 706 a retransmitted packet is transmitted using 5 dB smaller target SIR value than the first packet. With the decreasing power of the second transmission of a packet, the communication capacity increases. If the case represented by curve 700 is selected as a reference the case of curve 702 increases capacity by 5.1%, the case of curve 704 increases capacity by 13.30%, and the case of curve 706 increases capacity by 15.96%. Actually, the highest increase (16.41%) in capacity takes place close to the decrease of 4 dB for the retransmission of a packet in this configuration. There may be an optimum decrease in the target SIR value of the second transmission that has the maximum increase in capacity. However, a decrease in the target SIR value of the retransmission, particularly with respect to interference, usually tends to increase capacity.

According to an embodiment of the invention, the transmission power of the dedicated control channel may also be lowered during a retransmission of a packet or between transmissions of packets in order to decrease interference. This may be achieved by adjusting the target SIR value properly.

Even though the invention is described above with reference to an example according to the accompanying drawings, it is clear that the invention is not restricted thereto but it can be modified in several ways within the scope of the appended claims.

The invention claimed is:

1. A communication method, the method comprising:
communicating between at least two transceivers of a radio system using a packet switched connection through a radio interface;
measuring a quality of the packet switched connection;
adjusting a target Signal Interference Ratio based on the quality measured;
transmitting, from a transceiver receiving packets, a request to retransmit at least one packet having a failed reception;
retransmitting, from a transceiver transmitting packets, at least one retransmission packet requested as a response to the request; and
controlling a transmission power by setting a lower target Signal Interference Ratio for retransmission of a retransmission packet than the target Signal Interference Ratio for a first transmission of a corresponding packet.

2. The method of claim 1, further comprising:
defining a specific target Signal Interference Ratio for at least one retransmission of the retransmission packet.

3. The method of claim 1, further comprising:
setting a lower target Signal Interference Ratio for a dedicated control channel between transmissions of packets than during transmissions of the packets.

4. The method of claim 1, further comprising:
transmitting, from the transceiver receiving packets, a transmission strength at which to retransmit the at least the one packet having the failed reception.

5. The method of claim 1, further comprising:
setting the lower target Signal Interference Ratio according the algorithm:

$$\text{Target\_SIR}(N^{th}) = \text{Target\_SIR}(\text{master}) - \text{Step}(N_{th})\ [\text{dB}],$$

where $\text{Target\_SIR}(N^{th})$ denotes the SIR of an $N^{th}$ retransmission of a packet, $\text{Target\_SIR}(\text{master})$ denotes the target SIR of the first transmission of a packet, $\text{Step}(N^{th})$ denotes an amount by which to decrease the transmission power of the retransmission, and N is an ordinal number denoting an index of retransmission.

6. A communication arrangement, the arrangement comprising:
at least two transceivers of the radio system configured to communicate with a packet switched connection through a radio interface;
a measuring mechanism configured to measure a quality of the packet switched connection;
an adjusting mechanism configured to adjust a target Signal Interference Ratio based on the quality measured;
a transceiver configured to receive packets and to transmit a request to retransmit when there is a failure to receive at least one packet;
a transceiver configured to transmit packets and configured to retransmit at least one retransmission packet requested as a response to the request; and
a controller configured to set a lower target Signal Interference Ratio for retransmission of a packet than the target Signal Interference Ratio for a first transmission of the corresponding packet.

7. The arrangement of claim 6, wherein the arrangement is configured to define a specific target Signal Interference Ratio for at least one retransmission of the retransmission packet.

8. The arrangement of claim 6, wherein the controller is configured to set a lower target Signal Interference Ratio for a dedicated control channel between transmissions of packets than during the transmission of the packets.

9. The arrangement of claim 6, wherein the transceiver receiving the packets is configured to transmit a transmission strength at which to retransmit at least the one packet having a failed reception.

10. The arrangement of claim 6, wherein the controller is configured to set the lower target Signal Interference Ratio according to the algorithm:

$$\text{Target\_SIR}(N^{th}) = \text{Target\_SIR}(\text{master}) - \text{Step}(N^{th})\ [\text{dB}],$$

where $\text{Target\_SIR}(N^{th})$ denotes the SIR of an $N^{th}$ retransmission of a packet, $\text{Target\_SIR}(\text{master})$ denotes the target SIR of the first transmission of a packet, $\text{Step}(N^{th})$ denotes an amount by which to decrease the transmission power of the retransmission and N is an ordinal number denoting an index of retransmission.

11. A communication arrangement, the arrangement comprising:
communicating means for communicating between at least two transceivers of a radio system using a packet switched connection through a radio interface;
measuring means for measuring a quality of the packet switched connection;
adjusting means for adjusting a target Signal Interference Ratio based on the quality measured;
transmitting means for transmitting, from a transceiver receiving packets, a request to retransmit at least one packet having a failed reception;
retransmitting means for retransmitting, from a transceiver transmitting packets, at least one retransmission packet requested as a response to the request; and
controlling means for controlling a transmission power by setting a lower target Signal Interference Ratio for retransmission of a retransmission packet than the target Signal Interference Ratio for a first transmission of a corresponding packet.

12. A radio network controller in a CDMA radio system for communication with a packet switched connection through a radio interface, the radio system having a request for retransmission and a retransmission as a response to the request in the case of failure in reception of at least one packet, the radio network controller being configured to:
 receive a measured quality of the packet switched connection, and to adjust a target SIR based on a measured quality of the connection; and set a lower target SIR for retransmission of a packet than the target SIR for the first transmission of the corresponding packet.

* * * * *